S. B. STRONG.
Pump.
No. 165,629. Patented July 13, 1875.
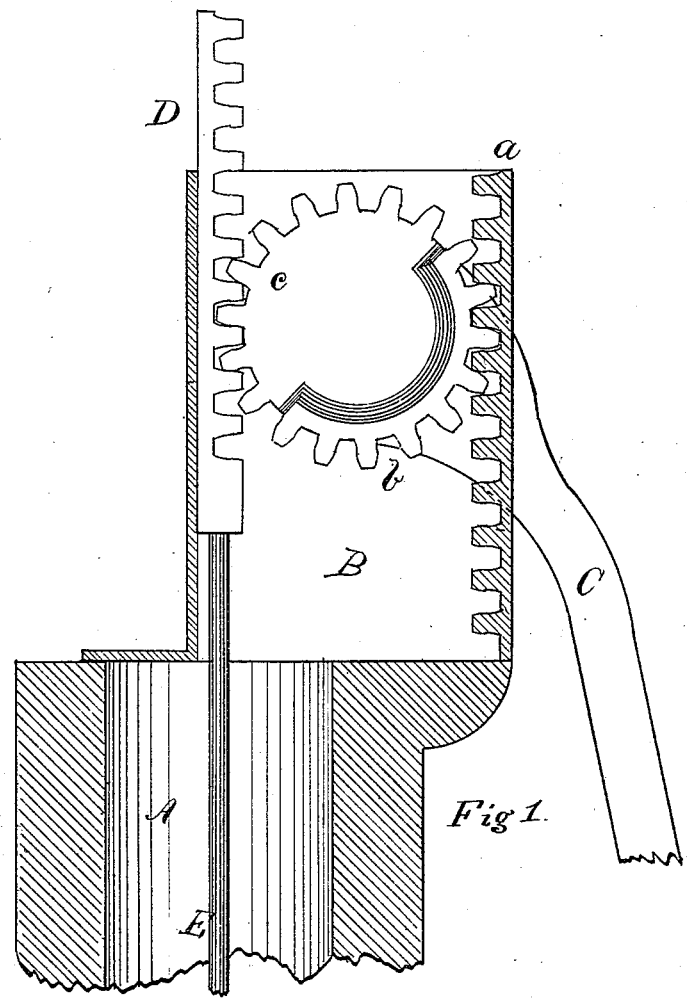
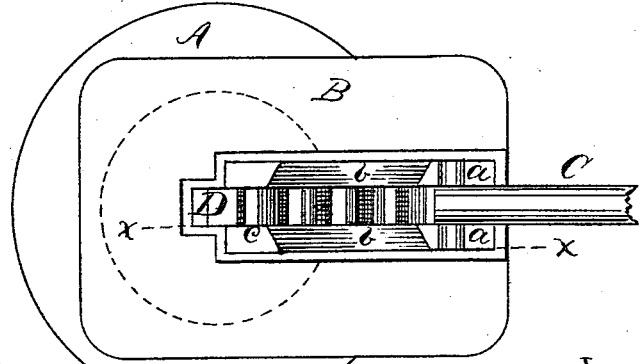
Fig. 1.
Fig. 2.
Witnesses:
H. M. Hopkins,
John A. Straight
Inventor:
Samuel B. Strong,
Pr Geo. M. Hopkins,
Atty.

UNITED STATES PATENT OFFICE.

SAMUEL B. STRONG, OF ALBION, NEW YORK.

IMPROVEMENT IN PUMPS.

Specification forming part of Letters Patent No. 165,629, dated July 13, 1875; application filed May 24, 1875.

*To all whom it may concern:*

Be it known that I, SAMUEL B. STRONG, of Albion, in the county of Orleans and State of New York, have invented certain Improvements in Pumps, of which the following is a specification:

My invention consists in a peculiar arrangement of racks and segmental gearing, whereby I obtain a greater motion in the piston of pumps than can be obtained by means of simple levers. I also secure a uniform motion and power in the piston, which is proportionate to the amount of power applied to the handle.

Figure 1 in the drawing is a vertical section through $x\,x$ in Fig. 2. Fig. 2 is a top view.

A is the stock of any ordinary pump, to the top of which a casing, B, is fixed. $a\,a$ are racks attached to the inside of the casing B. C is a handle, which is provided with the segments $b\,b$, which mesh into the racks $a\,a$, and also the segment $c$, which meshes into the rack D. A channel is made in the casing B, opposite the racks $a\,a$, in which the rack D may slide. E is the ordinary piston-rod, which is attached to the rack D.

It will be seen that the fulcrum of the handle C is at the point of engagement between the segments $b\,b$ and the racks $a\,a$, and that, as the handle is forced down, the fulcrum rises through a distance equivalent to the amount of rack traversed by the segments $b\,b$, while the rack D is moved double that distance. Double racks $a\,a$ and segments $b\,b$ are used to insure a firm bearing for the handle.

What I claim as new, and desire to secure by Letters Patent, is—

The combination of the racks $a\,a$, segments $b\,b$, segment $c$, rack D, handle C, casing B, pump-stock A, and piston-rod E, substantially as shown and described.

SAMUEL B. STRONG.

Witnesses:
H. M. HOPKINS,
JOHN A. STRAIGHT.